United States Patent [19]
Miyazaki et al.

[11] Patent Number: 5,372,171
[45] Date of Patent: Dec. 13, 1994

[54] PNEUMATIC TIRE WITH ASYMMETRICAL TREAD SHOULDERS

[75] Inventors: Yusaku Miyazaki; Masakazu Okihara, both of Hiratsuka; Yoshiaki Hashimura, Isehara; Naoyuki Katsura; Zenichiro Shida, both of Hiratsuka; Tomohiko Kogure, Ashigara, all of Japan

[73] Assignee: The Yokohama Rubber Co., Ltd., Tokyo, Japan

[21] Appl. No.: 1,699

[22] Filed: Jan. 7, 1993

[30] Foreign Application Priority Data

Feb. 5, 1992 [JP] Japan .................. 4-20117

[51] Int. Cl.$^5$ .............................. B60C 11/11
[52] U.S. Cl. ................... 152/209 R; 152/209 A
[58] Field of Search ........... 152/209 R, 209 D, 209 A

[56] References Cited

U.S. PATENT DOCUMENTS

| | | | |
|---|---|---|---|
| 4,683,928 | 8/1987 | Yahagi | 152/209 R |
| 4,745,954 | 5/1988 | Toyohara et al. | 152/209 R |
| 4,932,452 | 6/1990 | Kawabata et al. | 152/209 R |
| 5,054,530 | 10/1991 | Shiraishi | 152/209 A |
| 5,152,852 | 10/1992 | Hisamichi et al. | 152/209 A |
| 5,213,641 | 5/1993 | Tsuda et al. | 152/209 A |

FOREIGN PATENT DOCUMENTS

| | | | |
|---|---|---|---|
| 0347817 | 12/1989 | European Pat. Off. | 152/209 A |
| 0370699 | 5/1990 | European Pat. Off. | 152/209 A |
| 3815829 | 12/1988 | Germany | 152/209 A |
| 3121912 | 5/1991 | Japan | 152/209 D |
| 3220004 | 9/1991 | Japan | 152/209 D |
| 4108006 | 4/1992 | Japan . | |

Primary Examiner—Caleb Weston
Assistant Examiner—Nancy T. Krawczyk
Attorney, Agent, or Firm—Nikaido, Marmelstein, Murray & Oram

[57] ABSTRACT

In a pneumatic tire which is to be fitted to a wheel of the type in which connecting position of a disc to a rim is offsetted to a wheel outer side from a center of a rim width, and which has a plurality of blocks on a tread thereof, a pneumatic tire wherein a total contact area $C_2$ of shoulder blocks on the tire outer side disposed on the offset side of the disc and a total contact area $C_1$ of shoulder blocks on the tire inner side disposed on the opposite side to the offset side of the disc satisfy the relation, $C_1/C_2 = 1.2$ to $2.0$.

1 Claim, 3 Drawing Sheets

PNEUMATIC TIRE WITH ASYMMETRICAL TREAD SHOULDERS

BACKGROUND OF THE INVENTION

This invention relates to a pneumatic tire which improves driving comfort without lowering driving performance such as maneuvering stability.

Characteristics required for recent pneumatic tires are not only driving performance such as maneuvering stability but also higher driving comfort. Driving comfort of tires is typified by an impact value of vibration carried into a car from a road surface through the tires and by a magnitude of noises, and this vibration is transmitted into the car through a transmission route ranging from the tread of each tire, its outer and inner side walls, its outer and inner beads and a rim and disc.

To improve driving comfort, it has been customary to reduce block rigidity of the tread so as to reduce righting moment of external force given from the road surface.

However, if block rigidity is reduced throughout the entire tread surface, there occurs the problem that driving performance such as maneuvering stability drops.

With the conversion of a wheel driving system to a front wheel driving system (FWD) and with the expansion of the internal space of a cabin in recent years, an asymmetric structure has been employed for a wheel structure so as to maximize the inner space of the wheel, and an offset quantity of a connecting position of a disc to a rim from the center of a rim width to a wheel outer side has become greater and greater. The inventors of the present invention have carried out studies on the relationship of vibration transmission between the wheel having such an asymmetric structure and a tire, and have found that there is a very close correlationship between them.

In other words, when a vibration transmission factor transmitted from both side walls of the tire to the wheel having the asymmetric structure is examined, it has been clarified that the transmission factor of vibration passing through the rim end on the offset side (wheel outer side) of the disc is greater than the transmission factor of vibration passing through the rim end on the opposite side (wheel inner side), and moreover, this tendency becomes all the more remarkable with an increasing offset distance of the connecting position of the disc from the center of the rim width.

The inventors have further examined in detail this finding in relation with maneuvering stability, and have found out that the problems of maneuvering stability and driving comfort, which are contradictory to each other, can be solved and driving comfort can be improved by skillfully utilizing this correlationship.

SUMMARY OF THE INVENTION

It is therefore an object of the present invention to provide a pneumatic tire capable of increasing driving comfort without deteriorating driving performance such as maneuvering stability.

In a pneumatic tire to be fitted to a wheel of the type wherein a connecting position of a disc to a rim is offsetted to a wheel outer side from a center of a rim width, which tire has a plurality of blocks formed on a tread thereof, the object of the invention described above can be accomplished by a pneumatic tire having the structure in which an area ratio $C_1/C_2$ of a total contact area $C_1$ of shoulder blocks in a plurality of the blocks on the tire inner side disposed on the opposite side to the offset side of the disc to a total contact area $C_2$ of shoulder blocks in a plurality of the blocks on the tire outer side disposed on the offset side of the disc is 1.2 to 2.0.

When the area ratio $C_1/C_2$ of the total contact area $C_1$ of the shoulder blocks on the tire inner side to the total contact area $C_2$ of the shoulder blocks on the tire outer side is 1.2 to 2.0, block rigidity on the tire outer side disposed on the offset side of the disc, where the vibration transmission factor is great, can be reduced to reduce the transmission quantity of vibration, so that impact force and noise into the cabin can be reduced and driving comfort can be improved. When block rigidity on the tire inner side disposed on the opposite side to the offset side of the disc, where the vibration transmission factor is small, is kept equivalent to, or greater than, that of the prior art tire, driving performance such as maneuvering stability is not substantially lowered.

In the present invention, the term "total contact area"0 of the shoulder blocks represents the contact area of the shoulder blocks positioned at both right and left ends of the tire based on a contact width produced when the tire is in contact with the ground at 80% of a JATMA maximum load and at a JATMA standard pneumatic pressure, and represents the total area around the entire circumference of the tire.

The term "outer side" of the wheel and tire represents a side facing the outer side of the car body when the wheel and the tire are fitted to the car, and the term "inner side" represents a side facing the inner side of the car body. The offset side of the disc corresponds to the outer side, and the opposite side to the offset side corresponds to the inner side.

DETAILED DESCRIPTION OF THE PREFERRED EMBODIMENTS

Figure 1:
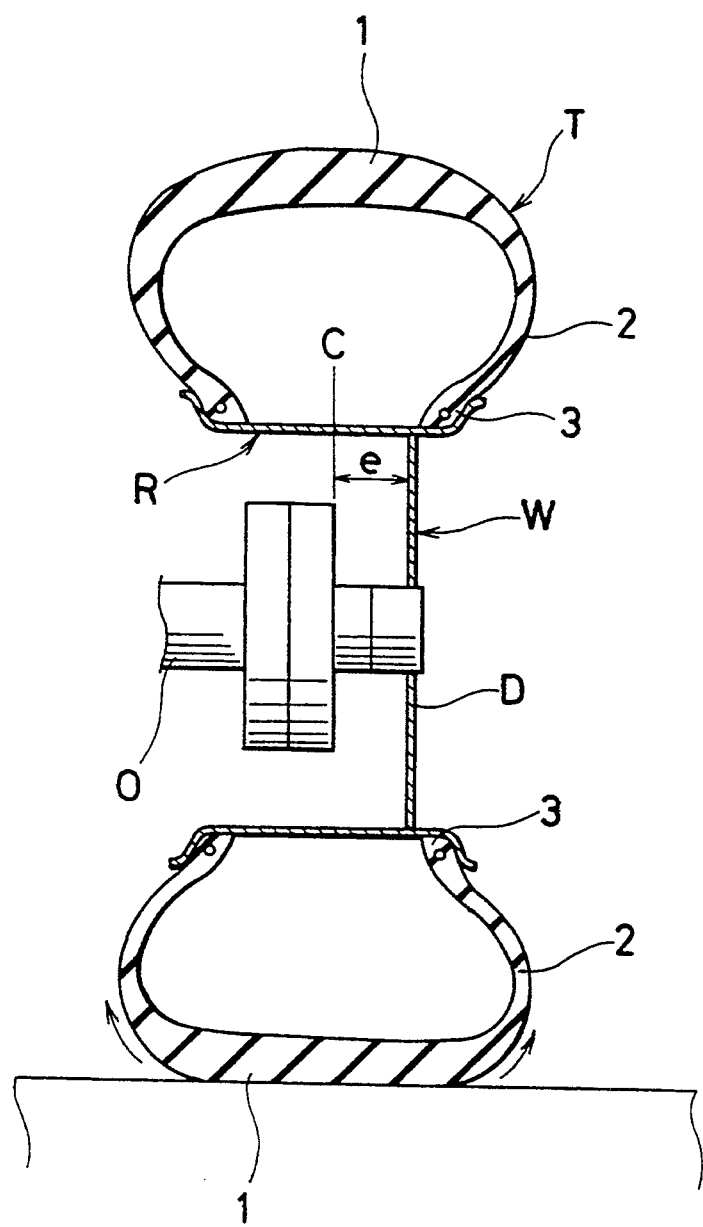
FIG. 1 is a schematic sectional view showing the state where a pneumatic tire according to the present invention is a fitted to a wheel.

In FIG. 1, symbol W represents a wheel fixed to an axle O, and symbol T represents a pneumatic tire fitted to this wheel W. The wheel W comprises a rim R and a disc D, and the disc D has an asymmetric structure in which it is offset by a distance e from a rim width-wise center with respect to the rim R and is fixed towards the wheel outer side. The pneumatic tire T comprises a tread 1, right and left sidewalls 2 and beads 3, and the beads 3 are fitted to the rim R of the wheel W.

Figure 2:
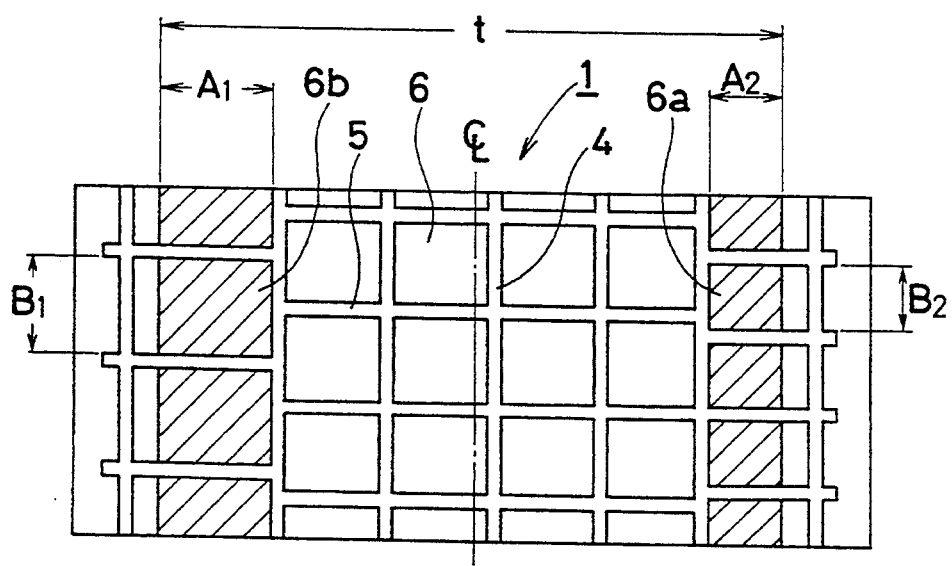
FIG. 2 is development showing a tread pattern of the pneumatic tire shown in FIG. 1.

FIG. 2 is a development of the tread 1. The tread 1 is equipped with a main groove 4 extending in a tire circumferential direction and lug grooves 5 extending in a tire width-wise direction, and these main groove 4 and lug grooves 5 together define a plurality of blocks 6 on the entire surface of the tread 1. The shoulder blocks 6a on the tire outer side positioned on the offset side of the disc D have a width $A_2$ and a length $B_2$ within a tread contract width t. On the other hand, the shoulder blocks $6b$ on the tire inner side positioned on the opposite side to the offset side of the disc D have a width $A_1$ and a length $B_1$ within the tread contract width t. At this time, when the total contract area of the shoulder blocks $6b$ around the entire tire circumference is $C_1 = \Sigma(A_1 \times B_1)$ and the total contract area of the shoulder blocks $6a$ around the entire tire circumference is $C_2 = \Sigma(A_2 \times B_2)$, the relation, $C_1/C_2 = 1.2$ to 2.0 is satisfied. When the total contact area $C_2$ of the shoulder blocks $6a$ on the tire outer side is set to be smaller than the total contact area $C_1$ of the shoulder blocks $6b$ on the tire inner side in this way, block rigidity on the tire outer side disposed on the offset side of the disc D can be made relatively small and a transmitted quantity of vibration can be reduced. Accordingly, driving comfort can be improved without deteriorating driving performance such as maneuvering stability.

Figure 3:
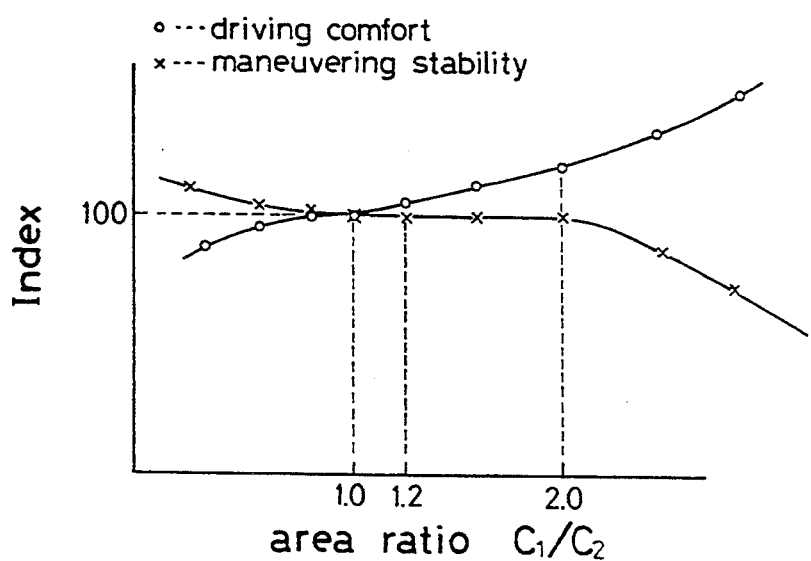
FIG. 3 is a graph showing the relation between an area ratio $C_1/C_2$ of a shoulder block and maneuvering stability and driving comfort.

FIG. 3 is a graph showing the relation between the area ratio $C_1/C_2$ of the shoulder blocks $6a$, $6b$ and maneuvering stability and driving comfort, wherein maneuvering stability and driving comfort are represented by indices using those of a conventional tire as 100, respectively. As can be seen clearly from this FIG. 3, driving comfort can be improved with an increasing area ratio $C_1/C_2$ and when the value is greater than 1.2, a remarkable effect can be obtained as compared with the conventional tire. However, when the area ratio $C_1/C_2$ is greater than 2.0, it can be understood that maneuvering stability becomes remarkably lower than that of the conventional tire.

In addition to the condition described above, it is preferred in the present invention that the ratio $A_1/A_2$ of the width $A_1$ of the shoulder blocks $6b$ to the width $A_2$ of the shoulder blocks $6a$ is within the range of 1.0 to 2.0, and the ratio $B_1/B_2$ of the length $B_1$ of the shoulder blocks $6b$ to the length $B_2$ of the shoulder blocks $6a$ is within the range of 1.0 to 2.0. Furthermore, the width $A_1$ of the shoulder blocks $6b$ and the width $A_2$ of the shoulder blocks $6a$ are preferably at least 15% of the tread contact width t, respectively. When the values $A_1$, $A_2$, $B_1$ and $B_2$ are set as described above, maneuvering stability can be reliably maintained. By the way, when the shoulder blocks are formed with curves or corrugations, their width and length are determined from their mean values.

According to the present invention described above, in a pneumatic tire to be fitted to a wheel having an asymmetric structure, the area ratio $C_1/C_2$ to of the total contact area $C_1$ of shoulder blocks on the tire inner side disposed on the opposite side to the offset side of the disc to the total contact area $C_2$ of the shoulder blocks on the tire outer side disposed on the offset side of the disc is set to be within the range of 1.2 to 2.0. According to this arrangement, the quantity of vibration transmitted from the tires to the car body through the wheels can be reduced and driving comfort can be improved. Since block rigidity on the tire inner side can be kept equal to, or higher than, that of the conventional tires, driving performance such as maneuvering stability is not lowered substantially.

EXAMPLE

Figure 4:
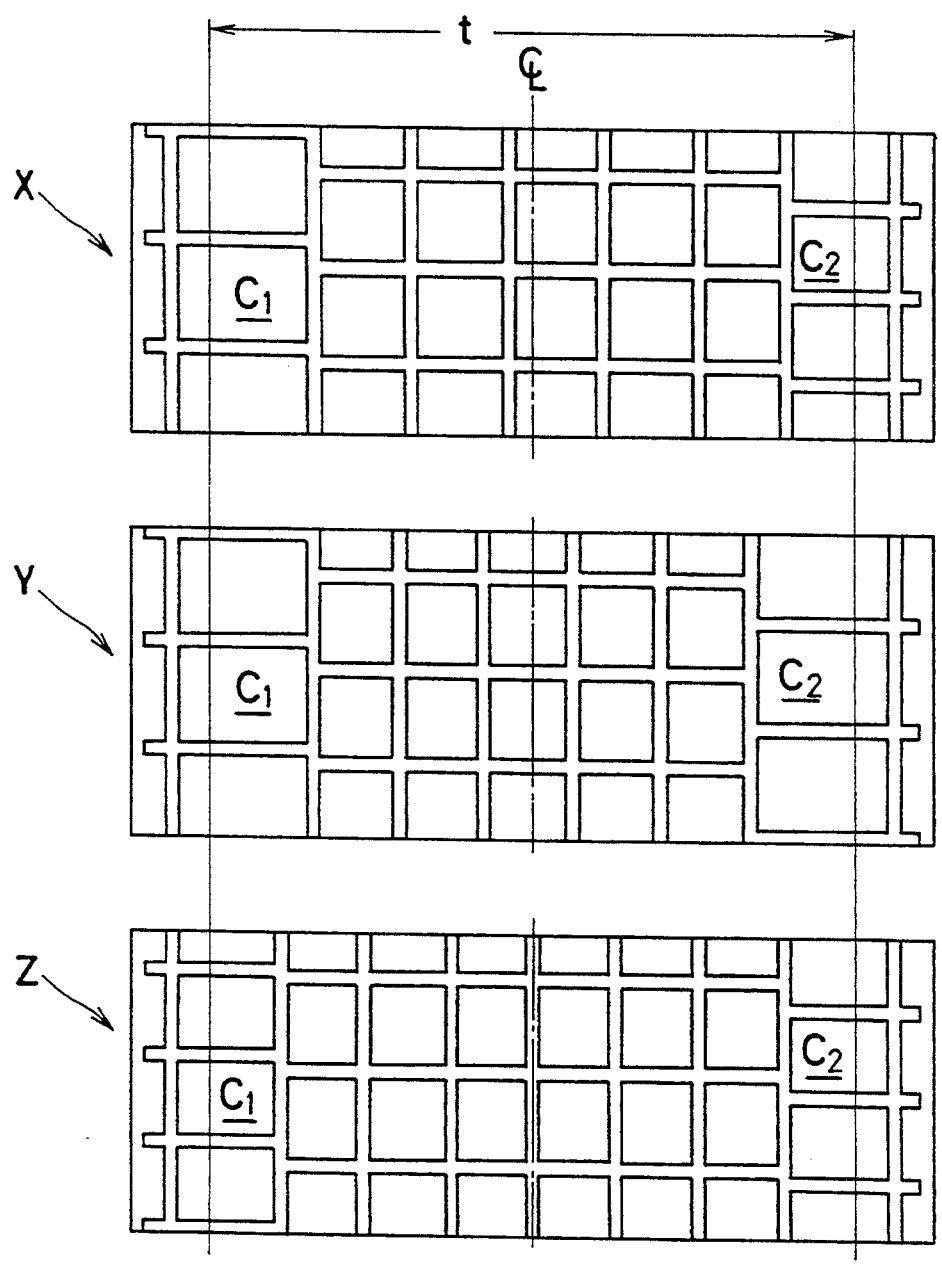
FIG. 4 is a development showing tread patterns of test tires.

A tire according to the present invention (FIG. 4-X) having a tire size of 195/70R14 and having an area ratio $C_1/C_2$ of 1.9 by making the total contact area $C_2$ of the shoulder blocks on the tire outer side smaller than the total contact area $C_1$ of the shoulder blocks on the tire-inner side, a Conventional Tire 1 (FIG. 4-Y) having an area ratio $C_1/C_2 = 1$ and a Conventional Tire (FIG. 4-z) having an area ratio $C_1/C_2 = 1$ were produced. The total contact areas $C_1$, $C_2$ of both shoulder blocks of the Conventional Tire 1 were equal to the total contact area $C_1$ of the shoulder blocks on the tire inner side of the present tire, and the total areas $C_1$, $C_2$ of both shoulder blocks of the Conventional Tire 2 were equal to the total contact area $C_2$ of the shoulder blocks on the tire outer side of the tire of the present invention.

Each of these tires was fitted to a wheel having as asymmetric structure which had a rim size of $14 \times 5.\frac{1}{2}$-JJ and in which a connecting position of a disc was offsetted by 35 mm from the center of a rim width towards the wheel outer side as shown in FIG. 1, and driving comfort and maneuvering stability were evaluated in accordance with the following method. The result was tabulated in Table 1.

Driving comfort

Each of the test tires was allowed to run under a condition of an air pressure of 2.0 kg/cm$^2$, a load of 430 kg and a speed of 50 km/hr on a drum having a drum diameter of 1,707 mm and equipped on the surface thereof with protuberances of a semi-circular cylinder having a radius of 10 mm. The difference between the maximum value and the minimum value of the impact force in a longitudinal direction occurring at this time was determined, and driving comfort was evaluated by a reciprocal of this difference. The evaluation value was represented by an index. The greater this index value, the higher becomes driving comfort.

Maneuvering stability

Each of the test tires having an air pressure of 2.0 kg/cm$^2$ was fitted to a front wheel-drive test car having displacement of 1,600 cc, and the test car was driven on a slalom test course having pylons implanted with predetermined gaps. Maneuvering stability was evaluated by the mean speed, and the evaluation value was represented by an index. The higher the index value, the higher becomes maneuvering stability.

TABLE 1

|  | Tire of this invention (X) | Conventional tire 1 (Y) | Conventional tire 2 (Z) |
| --- | --- | --- | --- |
| driving comfort | 105 | 95 | 105 |
| maneuvering stability | 100 | 105 | 95 |

As can be understood clearly from this Table 1, the tire of the present invention could improve driving comfort without deteriorating maneuvering stability, unlike the Conventional Tires 1 and 2. In other words, the Conventional Tire 1 having the increased total contact areas of both shoulder blocks was excellent in maneuvering stability but its driving comfort dropped. On the other hand, the Conventional Tire 2 having the decreased total contact areas of both shoulder blocks was excellent in driving comfort but its maneuvering stability dropped.

What is claimed is:

1. A wheel of the type wherein a connecting position of a disc to a rim is offset to a wheel outer side from a center of a rim width and a pneumatic tire fitted thereto, said tire having a plurality of blocks formed on a tread thereof, wherein a total contact area $C_2$ of shoulder blocks in a plurality of said blocks on one side of the tire tread disposed relative to and mounted on the wheel on the offset side of said disc and a total contact area $C_1$ of shoulder blocks in a plurality of said blocks on the other side of the tire tread disposed relative to and mounted on the wheel on the opposite side to said offset side of said disc satisfy the relation $C_1/C_2 = 1.2$ to 2.0 whereby total block rigidity of said one side of said tire tread is smaller that total block rigidity on said other side of said tire tread;

a ratio $A_1/A_2$ of a width $A_1$ of said shoulder block on said one side of said tire tread to a width $A_2$ of said shoulder block on said other side of said tire tread is from 1.0 to 2.0.;

a ratio $B_1/B_2$ of a length $B_1$ of said shoulder block on said one side of said tire tread to a length $B_2$ of said shoulder block on said other side of said tire tread is from 1.0 to 2.0;

said width $A_2$ of said shoulder block on said other side of said tire tread and said width $A_1$, of said shoulder block on said one side of said tire tread are each at least 15% of the tread contact width; and said plurality of said blocks are disposed on the entire surface of said tread.

* * * * *